Dec. 1, 1964 R. G. HAWKINS 3,158,961
ADJUSTABLE GLAZING SYSTEM
Filed May 19, 1961 2 Sheets-Sheet 1
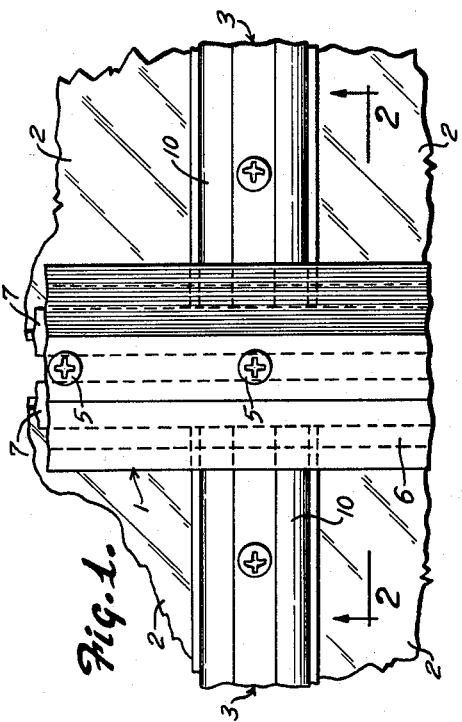
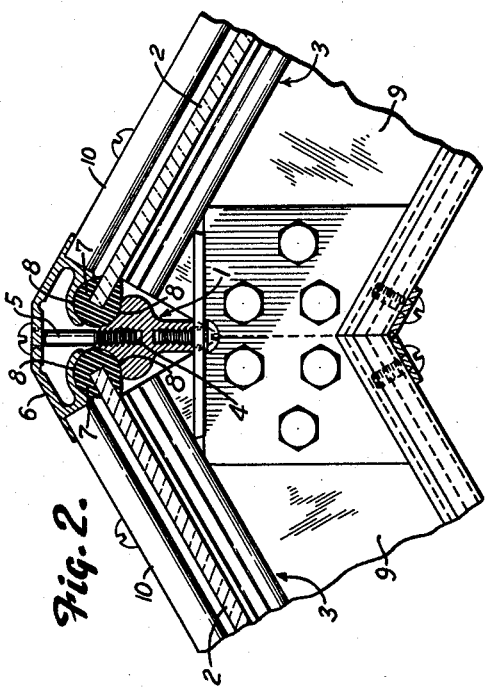
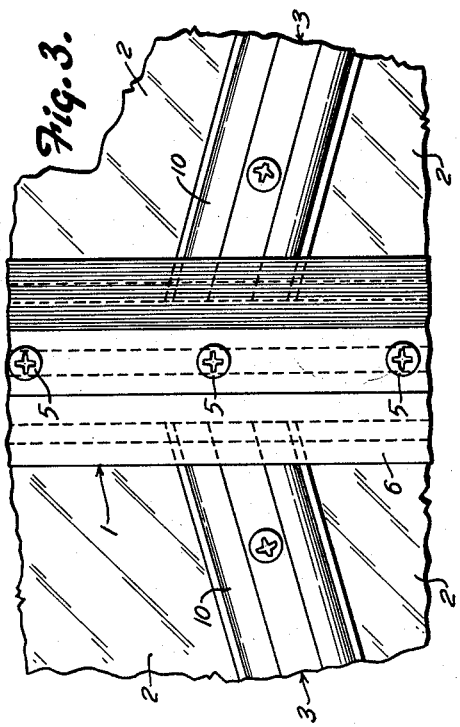
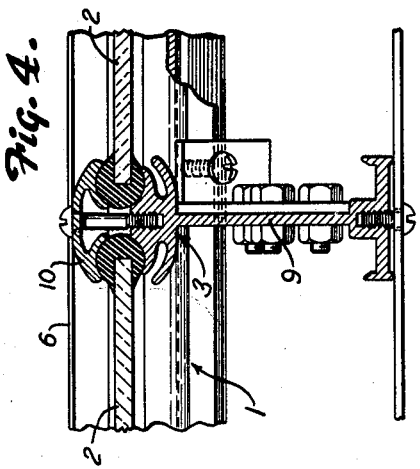
INVENTOR.
Ronald G. Hawkins
BY
Andrus & Starke
Attorneys

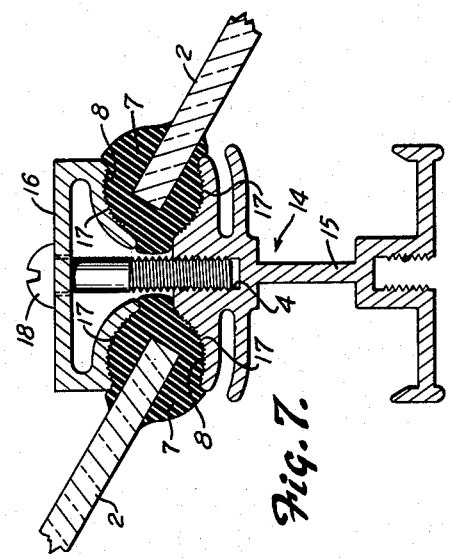
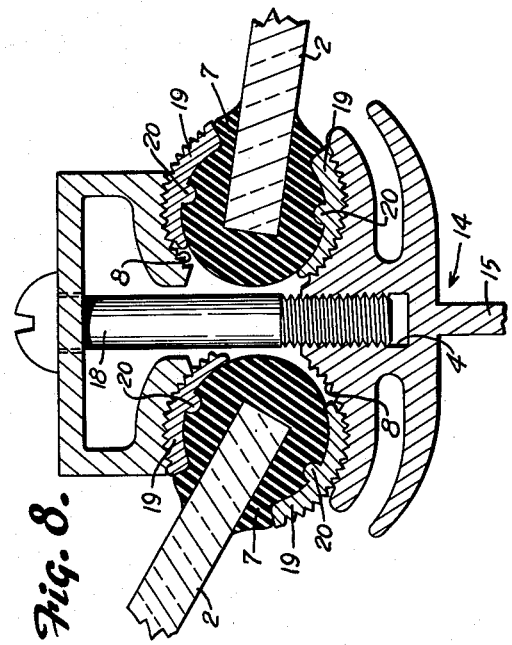
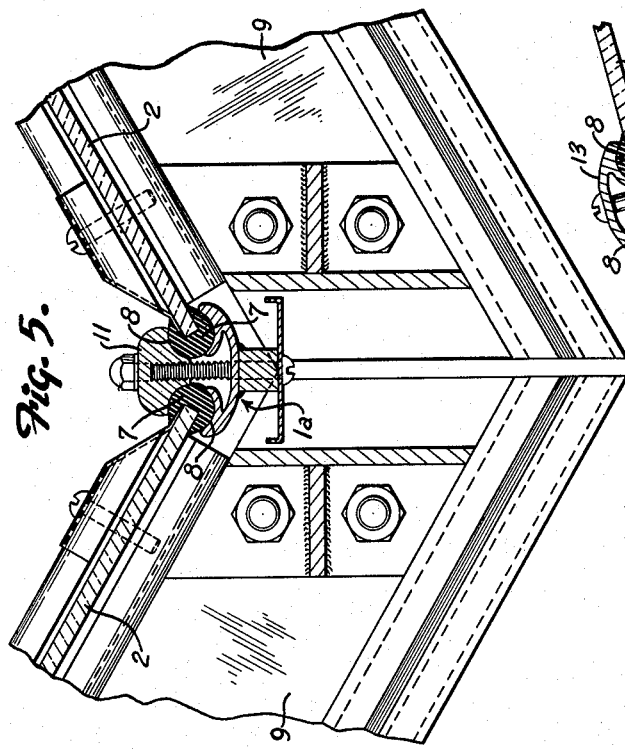
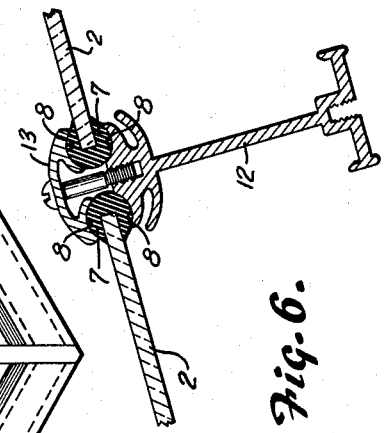

_United States Patent Office_

3,158,961
Patented Dec. 1, 1964

3,158,961
ADJUSTABLE GLAZING SYSTEM
Ronald G. Hawkins, Cedarburg, Wis., assignor to Super Sky Products, Inc., Thiensville, Wis., a corporation of Wisconsin
Filed May 19, 1961, Ser. No. 111,255
1 Claim. (Cl. 50—211)

This invention relates to an adjustable glazing system for skylights wherein the glass is sealed to the supporting rafters and struts in a manner providing for substantial angular adjustment without requiring additional substitute parts.

In the manufacture of variously shaped skylights it is sometimes necessary to employ a substantial number of lights of glass with each set at a different angle relative to adjacent lights. Heretofore such skylights have required special extruded aluminum rafters each shaped according to the various angles of the lights of glass. The cost of construction and of erection was very substantial.

The present invention provides a glazing system that employs a single or at most only a few rafter shapes, each rafter being capable of supporting the adjacent glass at any suitable angle within a wide range.

Furthermore, the invention provides a glazing system wherein cross struts between rafters can be disposed with their webs vertical while supporting glass at an angle in the general plane of the rafters.

The invention also provides a more effective seal between the glass and the frame and greatly facilitates assembly and erection.

The accompanying drawings illustrate the best mode presently contemplated by the inventor for carrying out the invention.

In the drawings:

FIGURE 1 is a top plan view of a portion of a skylight at a hip ridge;

FIG. 2 is a transverse vertical section taken on line 2—2 of FIG. 1;

FIG. 3 is a plan view similar to FIG. 1 showing the rafters disposed at an angle;

FIG. 4 is a transverse section through a rafter and parts of the adjacent glass;

FIG. 5 is a transverse vertical section of a valley in a skylight showing the glazing at a cross strut between rafters;

FIG. 6 is a transverse vertical section of an intermediate cross strut between rafters;

FIG. 7 is an enlarged vertical section similar to FIG. 6 and showing a modified form of construction in which the web of the strut is disposed vertically; and FIG. 8 is a view similar to FIG. 7 showing the employment of the sealing shoe to better confine and support the glazing strip.

The skylight glazing system of the present invention is very versatile for adapation to various skylight designs. Consequently, it is unnecessary to show a complete skylight design.

Referring to FIGS. 1 and 2 of the drawings, the ridge bar 1 joins two opposite downwardly inclined skylight sections, each made up of a plurality of lights of glass 2 joined edge to edge by intermediate rafter bars 3.

The rafter bars 3 may be inclined in a vertical plane normal to ridge bar 1, as shown in FIG. 1, or they may be disposed in corresponding vertical planes at an angle to the vertical plane of the ridge bar, as shown in FIG. 3.

The ridge bar 1 is preferably extruded aluminum or the like and extends longitudinally of the peak of the skylight. The bar 1 has a longitudinal central groove 4 facing upwardly with substantially vertical side walls to receive machine screws 5 at selected positions along the same for securing the ridge cap 6 in place.

The upper edge of glass 2 on either side of bar 1 is confined in an extruded glazing channel 7 of compressible solid neoprene of approximately 70 durometer, or the like, and which is of generally circular outer section confined between the bar 1 and cap 6 in complimental recesses 8 of arcuate section fitting the same.

The cap 6 is substantially spaced from the bar 1, thereby providing for use of the same in various skylight designs with differing angular location of the glass 2.

The rafter bars 3, as shown in FIG. 4, are of similar construction to the ridge bar and may have a depending central web 9 of any suitable shape for added strength and to which sub-ceiling (not shown) or any other structure may be attached. In this construction the rafter bar 3 may be identical to ridge bar 1 in shape, and the rafter cap 10 may be similar to cap 6.

In FIG. 5, a similar bar 1a is employed at a valley in the skylight, and a different cap 11 may be used to clamp the glass on the bar.

In FIG. 6, the strut 12 is shown as substantially identical to ridge bar 1 and the cap 13 is substantially identical to cap 6.

In all of the frame structures, such as ridge bar 1 and cap 6, rafter bar 3 and cap 10, valley bar 1a and cap 11, and strut 12 and cap 13, the arcuate recesses 8 are provided to receive the glazing strip 7 confining the corresponding edges of the glass 2. In each, the glass may be disposed at any selected angle prior to clamping of the glazing strip between the bar and cap.

In FIG. 2 the glass is disposed at a downward angle on opposite sides of the ridge bar 1. In FIG. 4 the glass is shown normal to the bar and the glass on opposite sides of the bar lies in the same plane. In FIG. 5 the glass is disposed at an upward angle on opposite sides of the bar 1a. In FIG. 6 the glass is in the same plane, normal to the strut and similar to FIG. 4.

The modified form of construction illustrated in FIG. 7 shows that with the wide selection of angular positions for the glass, it is possible to maintain the bar 14 of the strut with its web 15 vertical. In this construction the glass on one side of the bar extends upwardly from the bar while on the other side the glass extends downwardly. The two lights of glass do not lie in the same plane.

Also, in the modification of FIG. 7, the surfaces of recesses 8 in the bar 14 and cap 16 are serrated by longitudinal grooves which provide ridges 17 that embed themselves in the glazing strip 7 when cap 16 is drawn down into clamping relation to bar 14 by screws 18 spaced at suitable intervals along the structure.

Where the exposed surface of the glazing strip is substantial, as for instance, on the lower side of the upper glass in FIG. 7, it may be desirable to employ a clamping shoe 19, shown in FIG. 8, and which has an outer serrated surface matching that of the recess 8 to provide for adjustable angular location of the shoe as needed. The inner surface of shoe 19 may have one or more longitudinal ridges 20 which become embedded in the glazing strip 7 upon assembly.

If desired, shoes 19 may be provided above and below each glazing strip 7 as shown in FIG. 8, in all constructions.

Various modes of carrying out the invention are contemplated as being within the scope of the following claims particularly pointing out and distinctly claiming the subject matter which is regarded as the invention.

I claim:

In a glazing system for skylights having a bar with a shallow upwardly facing recess for supporting the edge of a glass pane, a cap for said bar having a shallow downwardly facing recess opposite said first named recess for confining the edge of the glass therebetween, and means removably securing said cap to said bar; said bar and cap providing a wide mouth therebetween for reception of the glass at various angles and said recesses being curved transversely on a radius generally providing a circular space therebetween; an extruded neoprene glazing strip of approximately 70 durometer and of generally circular section with a longitudinal groove therein receiving the edge of the glass pane, said strip being compressed in the space provided between said bar and cap by said recesses; and a shoe adjustably positioned in at least one of said recesses and adapted to reduce the open mouth between said bar and cap and confine said glazing strip therein, said shoe and the corresponding recess having interlocking longitudinally extending serrations for the retention of the shoe in any of several selected positions, and said shoe and glazing strip being in interlocking engagement.

References Cited in the file of this patent

UNITED STATES PATENTS

| | | |
|---|---|---|
| 792,358 | Solomon | June 13, 1905 |
| 798,309 | Voltz | Aug. 29, 1905 |
| 936,451 | Havenhill | Oct. 12, 1909 |
| 968,737 | Brogden | Aug. 30, 1910 |
| 1,721,596 | Himmel et al. | July 23, 1929 |
| 1,999,219 | Toney | Apr. 30, 1935 |
| 2,642,018 | Weeber | June 16, 1953 |
| 2,691,352 | Bowden | Oct. 12, 1954 |
| 2,781,111 | Kunkel | Feb. 12, 1957 |

FOREIGN PATENTS

| | | |
|---|---|---|
| 750,023 | Great Britain | June 6, 1956 |
| 809,202 | Great Britain | Feb. 18, 1959 |